United States Patent
Stevens, Jr. et al.

(10) Patent No.: US 11,444,411 B2
(45) Date of Patent: Sep. 13, 2022

(54) WEATHER PROTECTING (WP) BOOT FOR COAXIAL CABLE CONNECTORS

(71) Applicant: John Mezzalingua Associates, LLC, Liverpool, NY (US)

(72) Inventors: Brandon M. Stevens, Jr., Liverpool, NY (US); Cody Anderson, Joppa, MD (US); Christopher P. Natoli, Baldwinsville, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 113 days.

(21) Appl. No.: 16/622,667

(22) PCT Filed: Jun. 15, 2018

(86) PCT No.: PCT/US2018/037779
§ 371 (c)(1),
(2) Date: Dec. 13, 2019

(87) PCT Pub. No.: WO2018/232255
PCT Pub. Date: Dec. 20, 2018

(65) Prior Publication Data
US 2021/0151927 A1 May 20, 2021

Related U.S. Application Data

(60) Provisional application No. 62/520,937, filed on Jun. 16, 2017.

(51) Int. Cl.
*H01R 13/40* (2006.01)
*H01R 13/52* (2006.01)
*H01R 43/00* (2006.01)

(52) U.S. Cl.
CPC ....... *H01R 13/5213* (2013.01); *H01R 43/005* (2013.01); *H01R 2201/02* (2013.01)

(58) Field of Classification Search
CPC ............ H01R 13/5202; H01R 13/5213; H01R 4/72; H01R 43/005
(Continued)

(56) References Cited

U.S. PATENT DOCUMENTS

| 7,585,178 B1 * | 9/2009 | Abrahamsson | H01R 27/00 439/309 |
| 8,262,408 B1 * | 9/2012 | Kelly | H01R 9/0524 439/578 |
| 10,027,053 B2 * | 7/2018 | Antonini | H01R 24/38 |

(Continued)

FOREIGN PATENT DOCUMENTS

| CN | 1918750 A | 2/2007 |
| CN | 201820954 U | 5/2011 |

(Continued)

OTHER PUBLICATIONS

International Searching Authority, International Search Report and Written Opinion, Completed: Oct. 5, 2018, dated Oct. 5, 2018 (12 pages).

(Continued)

*Primary Examiner* — Hae Moon Hyeon
(74) *Attorney, Agent, or Firm* — Barclay Damon LLP

(57) ABSTRACT

A weather protection system for a coaxial cable connector comprising: (i) an over-mold cap disposed over a prepared end of a coaxial cable, (ii) a compliant Weather Protecting (WP) boot circumscribing the over-mold cap, and a mating interface disposed between an outer surface of the over-mold cap and an inner surface of the compliant WP boot. The mating interface is configured to provide tactile feed- (Continued)

back to an assembler/technician when assembling the WP boot in combination with the over-mold cap.

11 Claims, 14 Drawing Sheets

(58) Field of Classification Search
USPC .................................................. 439/587, 523
See application file for complete search history.

(56) References Cited

U.S. PATENT DOCUMENTS

| | | | |
|---|---|---|---|
| 2007/0049078 A1 | 3/2007 | Khemakhem | |
| 2007/0287329 A1 | 12/2007 | Jackson et al. | |
| 2013/0337670 A1* | 12/2013 | Montena | H01R 13/5213 439/149 |
| 2014/0220805 A1* | 8/2014 | Haberek | H01R 9/0521 439/277 |
| 2015/0332609 A1 | 11/2015 | Natoli | |
| 2015/0332809 A1 | 11/2015 | Natoli et al. | |
| 2015/0380861 A1 | 12/2015 | Harwath et al. | |
| 2015/0380920 A1 | 12/2015 | Natoli | |
| 2017/0018871 A1 | 1/2017 | Vaccaro | |
| 2019/0305475 A1* | 10/2019 | Stevens | H01R 13/5205 |

FOREIGN PATENT DOCUMENTS

| | | |
|---|---|---|
| CN | 201985324 U | 9/2011 |
| CN | 102870286 A | 1/2013 |
| CN | 204885670 U | 12/2015 |
| DE | 2010019600 A1 | 11/2011 |
| DE | 102010019600 A1 | 11/2011 |
| DE | 202014002319 U1 | 3/2014 |
| JP | 2005229711 A | 8/2005 |

OTHER PUBLICATIONS

International Preliminary Examining Authority, International Preliminary Report on Patentability, Completed: Jun. 11, 2019, dated Jun. 19, 2019 (8 pages).
National Intellectual Property Administration, P.R. China, First Office Action and Search Report, dated Nov. 4, 2020.
European Patent Office, Extended Search Report, dated Feb. 4, 2021, 11 Pages.
Australian Government, First Examination Report. dated Jun. 21, 2022, 3 Pages.
European Patent Office, Communication regarding Invitation to Correct Deficiencies, Application No. 18818669.6, dated May 30, 2022, 6 Pages.

* cited by examiner

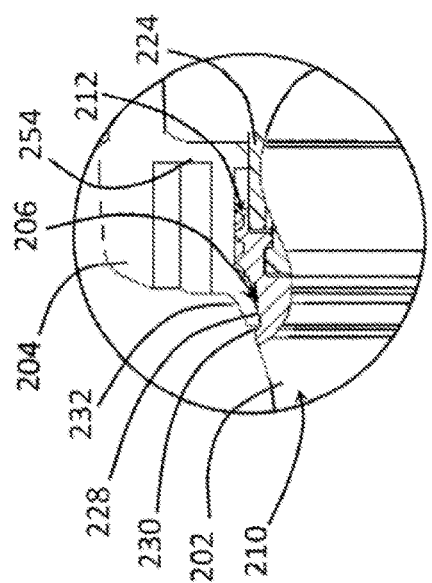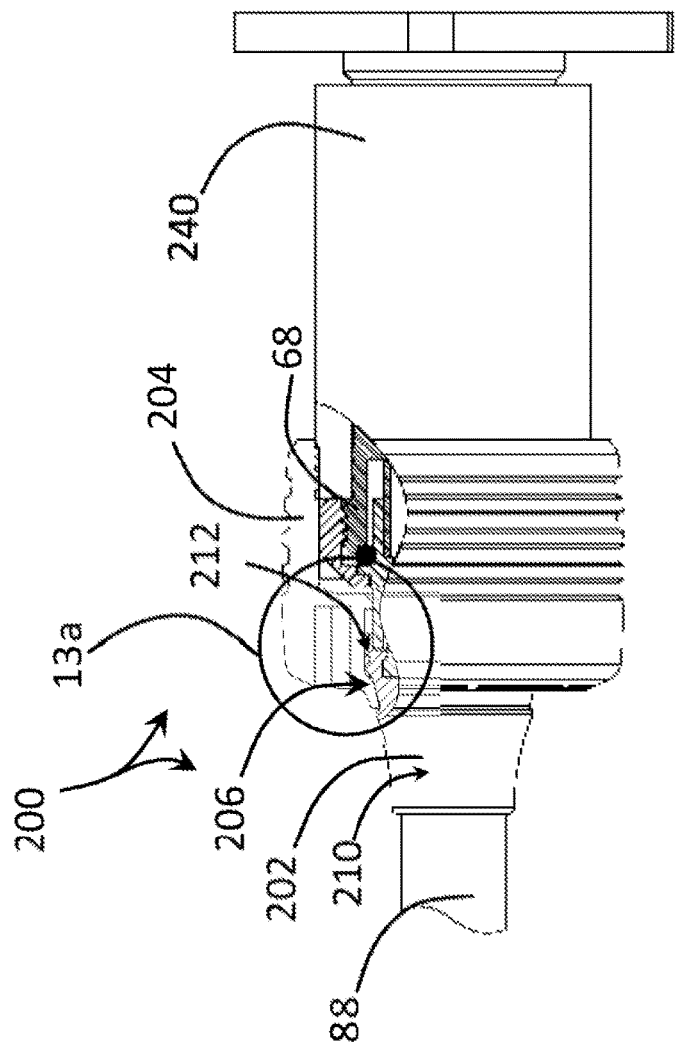

WEATHER PROTECTING (WP) BOOT FOR COAXIAL CABLE CONNECTORS

BACKGROUND

Coaxial cables are typically connected to interface ports, or corresponding connectors, for the operation of various electronic devices, such as cell phones, televisions and video recording devices. Typically, coaxial cables are installed on cell towers, in harsh outdoor environments which subject the cable/connectors to rain, snow, ice, wind and other elements. To protect the cable/connectors from the elements, a variety of weatherproofing systems have been devised providing crucial protection for electrical connectors installed on such cellular antennas/towers. Initially, weather proofing methods included the use of a fluid butyl sealant in combination with mastic tape disposed about the coaxial cable/connectors which were difficult to manipulate and messy to clean-up. Other, more sophisticated, Weather Protection Systems (WPS) in use today, include a soft silicone boot/sleeve which covers and protects most or all of the cable connection. That is, a rather large boot slides over the connection to produce a seal on both sides of the connection.

It will be appreciated that most cable connectors/interface ports present a variety of irregular surfaces, e.g., a threaded surface, polygonal surfaces (defining a hex exterior configuration), a plurality of steps, etc., which can be difficult to protect due to problems associated with producing a reliable seal over such irregular surfaces. As a result, environmental elements can penetrate the cable connections causing problems with cellular communications.

One difficulty associated with the assembly of conventional WPS devices relates to the inability to provide proper feedback, i.e., tactile feedback, to the installer to indicate whether or not the WPS device was installed correctly, i.e., at the right location along the coaxial cable. Improper installation can not only lead to weather-induced degradation of the connector, but also to increased replacement costs. With respect to the latter, the time associated with: (i) travel to and from a remotely-located tower, (ii) climbing up and down a lofty antenna, and (iii) removal and reassembly of, a weather-frozen, connector assembly, can add considerable time and effort associated with the repair of an improperly or incorrectly installed coaxial cable connector.

Accordingly, there is a need to overcome, or otherwise lessen the effects of, the disadvantages and shortcomings described above.

SUMMARY

A seal assembly is provided for a coaxial cable connector comprising: (i) an over-mold cap disposed over a prepared end of a coaxial cable, (ii) a compliant Weather Protecting (WP) boot circumscribing the over-mold cap, and a mating interface disposed between an outer surface of the over-mold cap and an inner surface of the compliant WP boot. The mating interface is configured to provide tactile feedback to an assembler/technician when assembling the WP boot in combination with the over-mold cap.

BRIEF DESCRIPTION OF THE DRAWINGS

Additional features and advantages of the present disclosure are described in, and will be apparent from, the following Brief Description of the Drawings and Detailed Description.

FIG. 13 is a partially broken-away, profile view of the over-mold cap formed over (e.g., heat-formed) in combination with the compliant outer jacket of the coaxial cable/connector.

FIG. 13a is an enlarged view of the mating interface between the Weather Protection (WP) boot and the over-mold cap.

DETAILED DESCRIPTION

Wireless Communication Networks

In one embodiment, wireless communications are operable based on a network switching subsystem ("NSS"). The NSS includes a circuit-switched core network for circuit-switched phone connections. The NSS also includes a general packet radio service architecture which enables mobile networks, such as 2G, 3G and 4G mobile networks, to transmit Internet Protocol ("IP") packets to external networks such as the Internet. The general packet radio service architecture enables mobile phones to have access to services such as Wireless Application Protocol ("WAP"), Multimedia Messaging Service ("MSS") and the Internet.

A service provider or carrier operates a plurality of centralized mobile telephone switching offices ("MTSOs"). Each MTSO controls the base stations within a select region or cell surrounding the MTSO. The MTSOs also handle connections to the Internet and phone connections.

Figure 1:
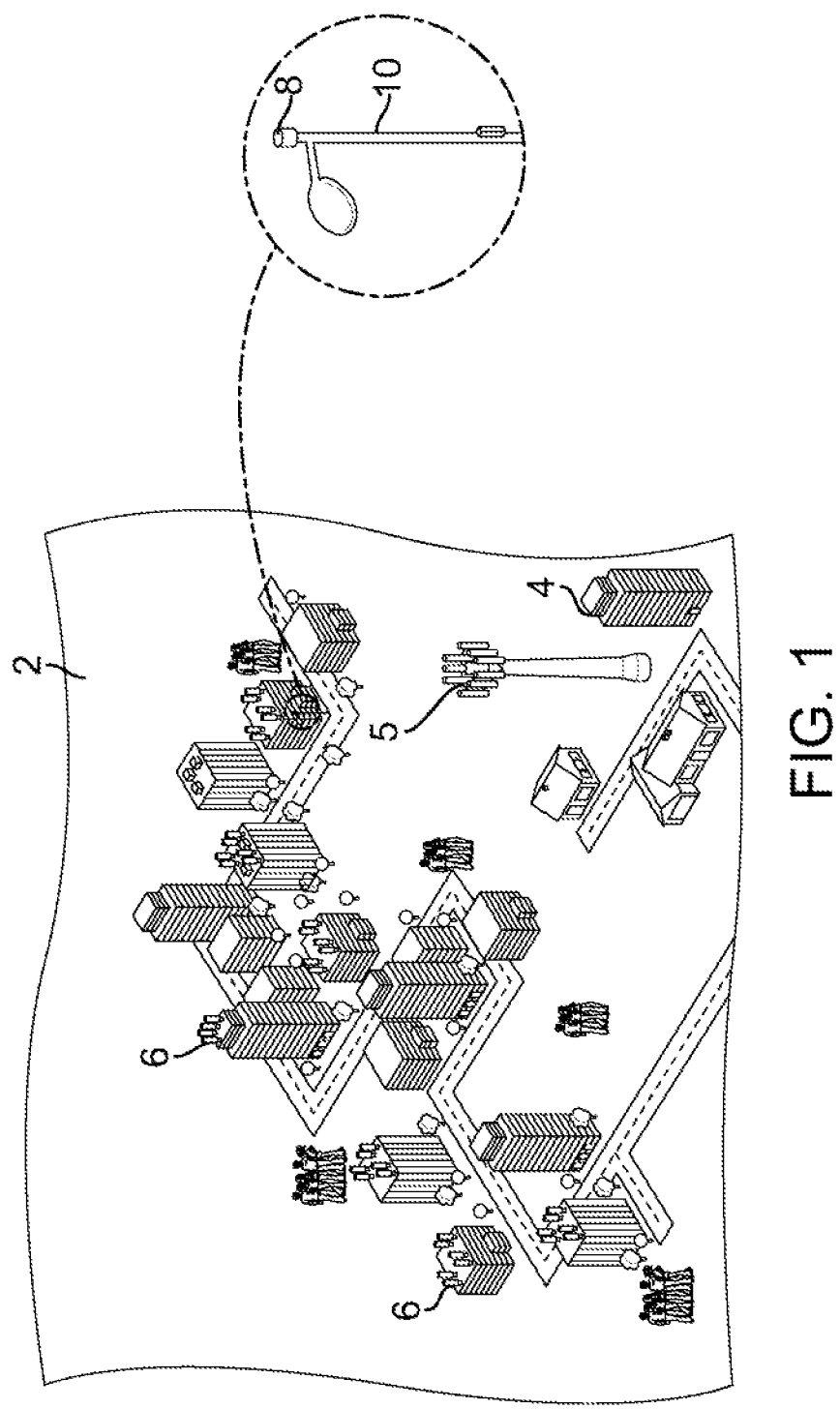
FIG. 1 is a schematic diagram illustrating an example of one embodiment of an outdoor wireless communication network.

Referring to FIG. 1, an outdoor wireless communication network 2 includes a cell site or cellular base station 4. The base station 4, in conjunction with cellular tower 5, serves communication devices, such as mobile phones, in a defined area surrounding the base station 4. The cellular tower 5 also communicates with macro antennas 6 on building tops as well as micro antennas 8 mounted to, for example, street lamps 10.

The cell size depends upon the type of wireless network. For example, a macro cell can have a base station antenna installed on a tower or a building above the average rooftop level, such as the macro antennas 6. A micro cell can have an antenna installed at a height below the average rooftop level, often suitable for urban environments, such as the street lamp-mounted micro antenna 8. A picocell is a relatively small cell often suitable for indoor use.

Figure 2:
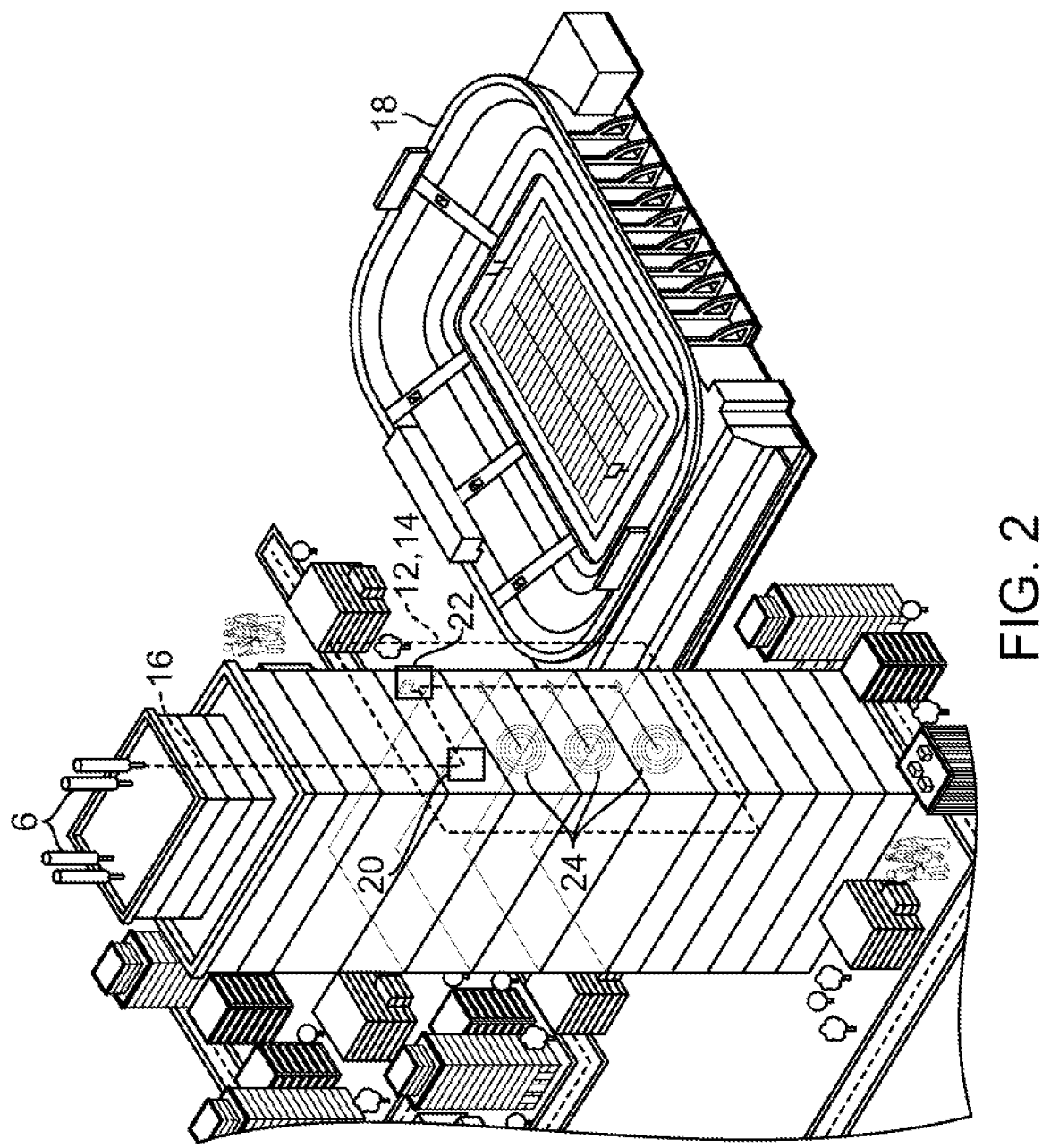
FIG. 2 is a schematic diagram illustrating an example of one embodiment of an indoor wireless communication network.

As illustrated in FIG. 2, an indoor wireless communication network 12 includes an active distributed antenna system ("DAS") 14. The DAS 14 can, for example, be installed in a high rise commercial office building 16, a sports stadium 8 or a shopping mall. In one embodiment, the DAS 14 includes macro antennas 6 coupled to a radio frequency ("RF") repeater 20. The macro antennas 6 receive signals from a nearby base station. The RF repeater 20 amplifies and repeats the received signals. The RF repeater 20 is coupled to a DAS master unit 22 which, in turn, is coupled to a plurality of remote antenna units 24 distributed throughout the building 16. Depending upon the embodiment, the DAS master unit 22 can manage over one hundred remote antenna units 24 in a building. In operation, the DAS master unit 22, as programmed and controlled by a DAS manager, is operable to control and manage the coverage and performance of the remote antenna units 24 based on the number of repeated signals fed by the RF repeater 20. It should be appreciated that a technician can remotely control the DAS master unit 22 through a Local Area Network (LAN) connection or wireless modem.

Depending upon the embodiment, the RF repeater 20 can be an analog repeater that amplifies all received signals, or the RF repeater 20 can be a digital repeater. In one embodiment, the digital repeater includes a processor and a memory device or data storage device. The data storage device stores logic in the form of computer-readable instructions. The processor executes the logic to filter or clean the received signals before repeating the signals. In one embodiment, the digital repeater does not need to receive signals from an external antenna, but rather, has a built-in antenna located within its housing.

Base Stations

Figure 3:
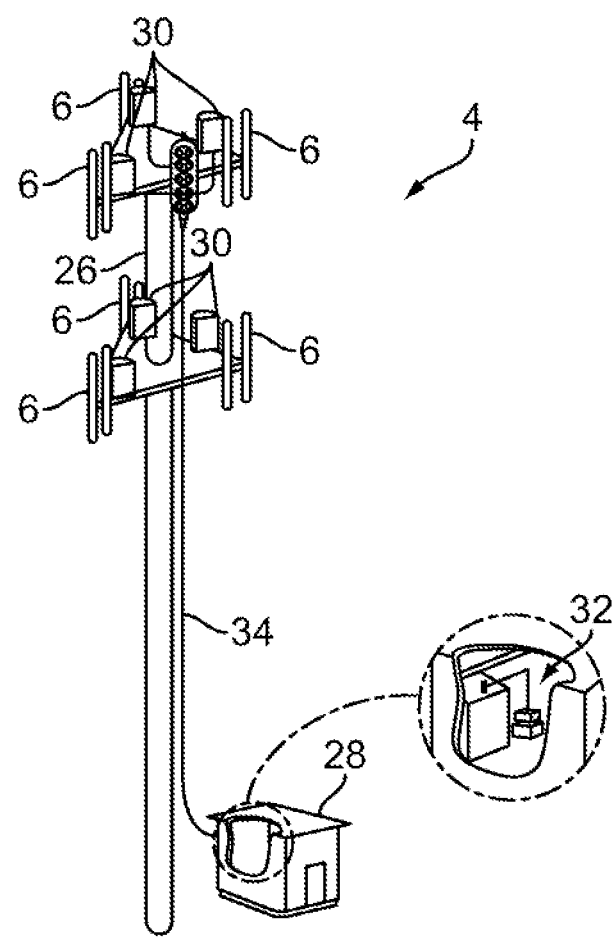
FIG. 3 is an isometric view of one embodiment of a base station illustrating a tower and ground shelter.

In one embodiment illustrated in FIG. 3, the base station 4 includes a tower 26 and a ground shelter 28 proximal to the tower 26. In this example, a plurality of exterior antennas 6 and remote radio heads 30 are mounted to the tower 26. The shelter 28 encloses base station equipment 32. Depending upon the embodiment, the base station equipment 32 includes electrical hardware operable to transmit and receive radio signals and to encrypt and decrypt communications with the MTSO. The base station equipment 32 also includes power supply units and equipment for powering and controlling the antennas and other devices mounted to the tower 26.

In one embodiment, a distribution line 34, such as coaxial cable or fiber optic cable, distributes signals that are exchanged between the base station equipment 32 and the remote radio heads 30. Each remote radio head 30 is operatively coupled, and mounted adjacent, a group of associated macro antennas 6. Each remote radio head 30 manages the distribution of signals between its associated macro antennas 6 and the base station equipment 32. In one embodiment, the remote radio heads 30 extend the coverage and efficiency of the macro antennas 6. The remote radio heads 30, in one embodiment, have RF circuitry, analog-to-digital/digital-to-analog converters and up/down converters.

Antennas

The antennas, such as macro antennas 6, micro antennas 8 and remote antenna units 24, are operable to receive signals from communication devices and send signals to the communication devices. Depending upon the embodiment, the antennas can be of different types, including, but not limited to, directional antennas, omni-directional antennas, isotropic antennas, dish-shaped antennas, and microwave antennas. Directional antennas can improve reception in higher traffic areas, along highways, and inside buildings like stadiums and arenas. Based upon applicable laws, a service provider may operate omni-directional cell tower signals up to a maximum power, such as 100 watts, while the service provider may operate directional cell tower signals up to a higher maximum of effective radiated power ("ERP"), such as 500 watts.

An omni-directional antenna is operable to radiate radio wave power uniformly in all directions in one plane. The radiation pattern can be similar to a doughnut shape where the antenna is at the center of the donut. The radial distance from the center represents the power radiated in that direction. The power radiated is maximum in horizontal directions, dropping to zero directly above and below the antenna.

An isotropic antenna is operable to radiate equal power in all directions and has a spherical radiation pattern. Omni-directional antennas, when properly mounted, can save energy in comparison to isotropic antennas. For example, since their radiation drops off with elevation angle, little radio energy is aimed into the sky or down toward the earth where it could be wasted. In contrast, isotropic antennas can waste such energy.

In one embodiment, the antenna has: (a) a transceiver moveably mounted to an antenna frame; (b) a transmitting data port, a receiving data port, or a transceiver data port; (c) an electrical unit having a printed circuit (PC) board controller and motor; (d) a housing or enclosure that covers the electrical unit; and (e) a drive assembly or drive mechanism that couples the motor to the antenna frame. Depending upon the embodiment, the transceiver can be tiltably, pivotably or rotatably mounted to the antenna frame. One or more cables connect the antenna's electrical unit to the base station equipment 32 for providing electrical power and motor control signals to the antenna. A technician of a service provider can reposition the antenna by providing desired inputs using the base station equipment 32. For example, if the antenna has poor reception, the technician can enter tilt inputs to change the tilt angle of the antenna from the ground without having to climb up to reach the antenna. As a result, the antenna's motor drives the antenna frame to the specified position. Depending upon the embodiment, a technician can control the position of the moveable antenna from the base station, from a distant office or from a land vehicle by providing inputs over the Internet.

Data Interface Ports

Figure 4:
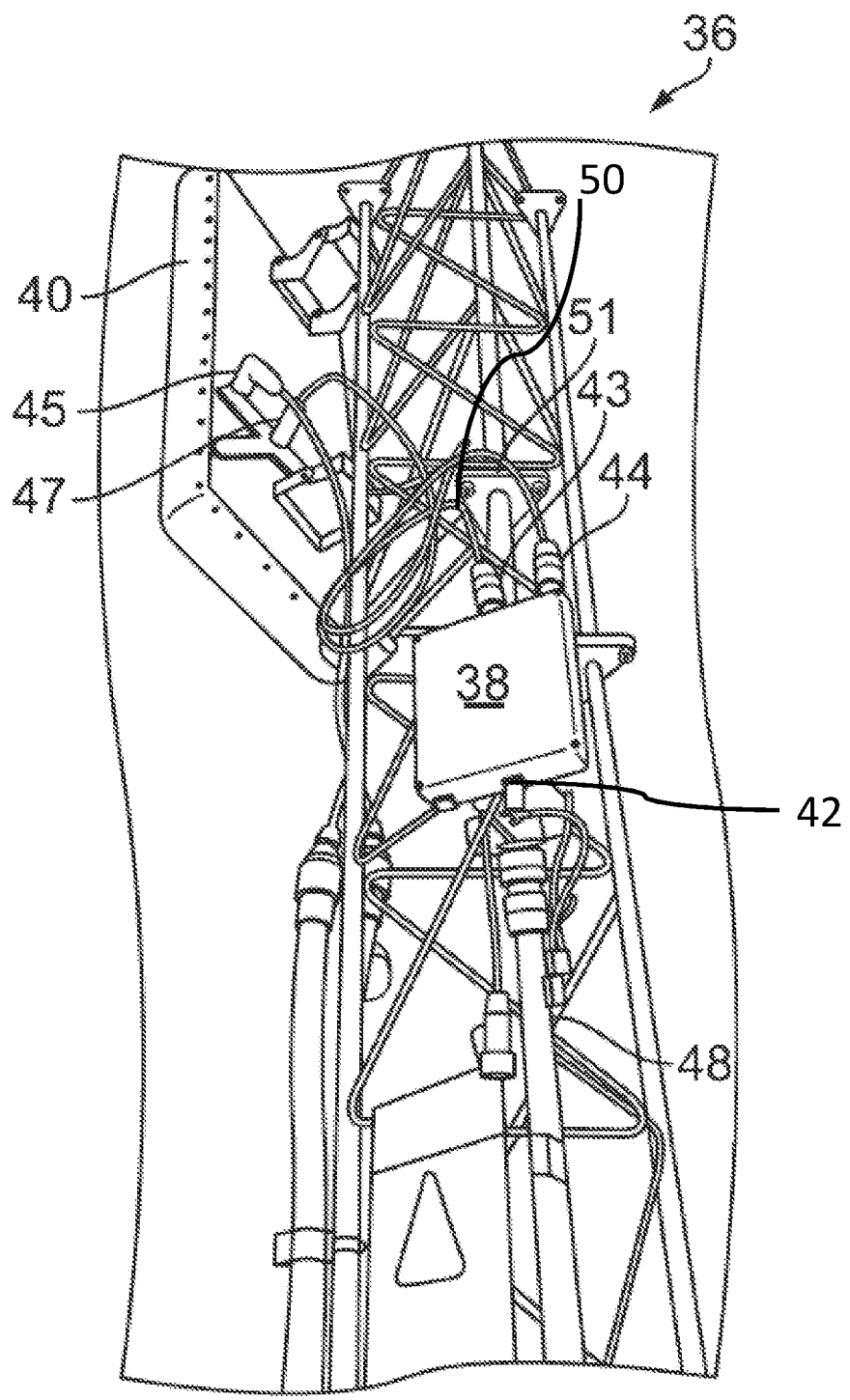
FIG. 4 is an isometric view of one embodiment of a tower.

Generally, the networks 2 and 12 include a plurality of wireless network devices, including, but not limited to, the base station equipment 32, one or more radio heads 30, macro antennas 6, micro antennas 8, RF repeaters 20 and remote antenna units 24. As described above, these network devices include data interface ports which couple to connectors of signal-carrying cables, such as coaxial cables and fiber optic cables. In the example illustrated in FIG. 4, the tower 36 supports a radio head 38 and macro antenna 40. The radio head 38 has interface ports 42, 43 and 44 and the macro antenna 40 has antenna ports 45 and 47. In the example shown, the coaxial cable 48 is connected to the radio head interface port 42, while the coaxial cable jumpers 50 and 51 are connected to radio head interface ports 43 and 44, respectively. The coaxial cable jumpers 50 and 51 are also connected to antenna ports 45 and 47, respectively.

The interface ports of the networks 2 and 12 can have different shapes, sizes and surface types depending upon the embodiment. In one embodiment illustrated in FIG. 5, the interface port 52 has a tubular or cylindrical shape. The interface port 52 includes: (a) a forward end or base 54 configured to abut the network device enclosure, housing or wall 56 of a network device; (b) a coupler engager 58 configured to be engaged with a cable connector's coupler, such as a nut; (c) an electrical ground 60 received by the coupler engager 58; and (d) a signal carrier 62 received by the electrical ground 60.

Figure 6:
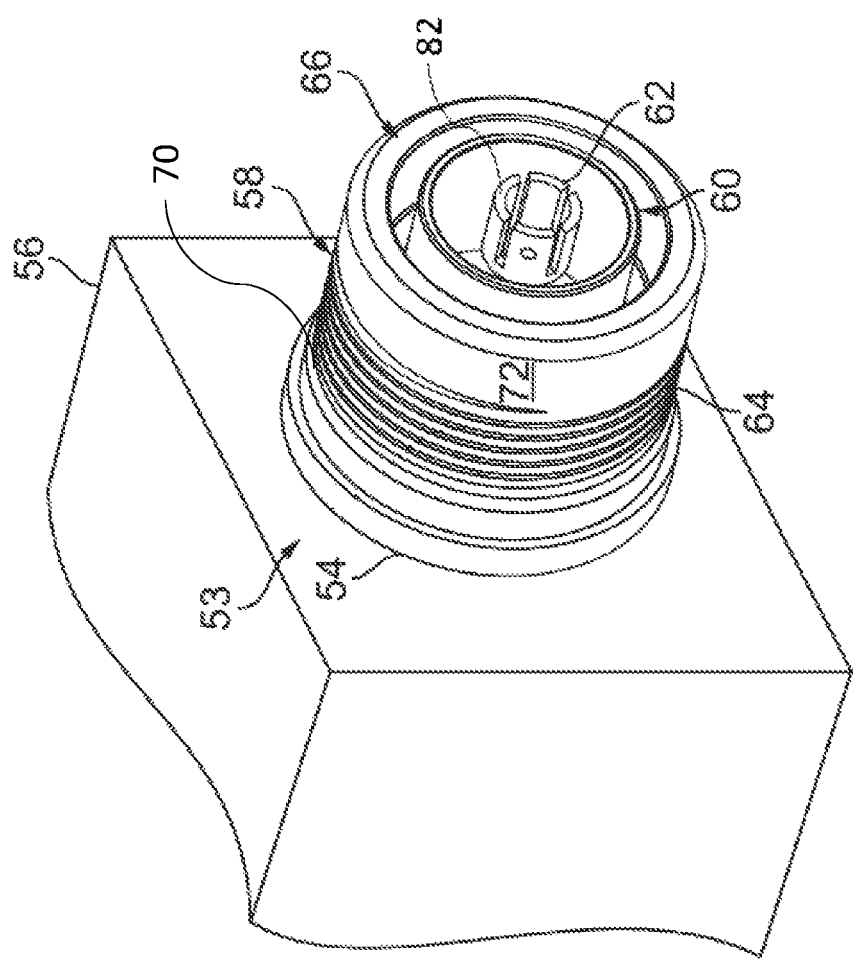
FIG. 6 is an isometric view of another embodiment of an interface port.
Figure 7:
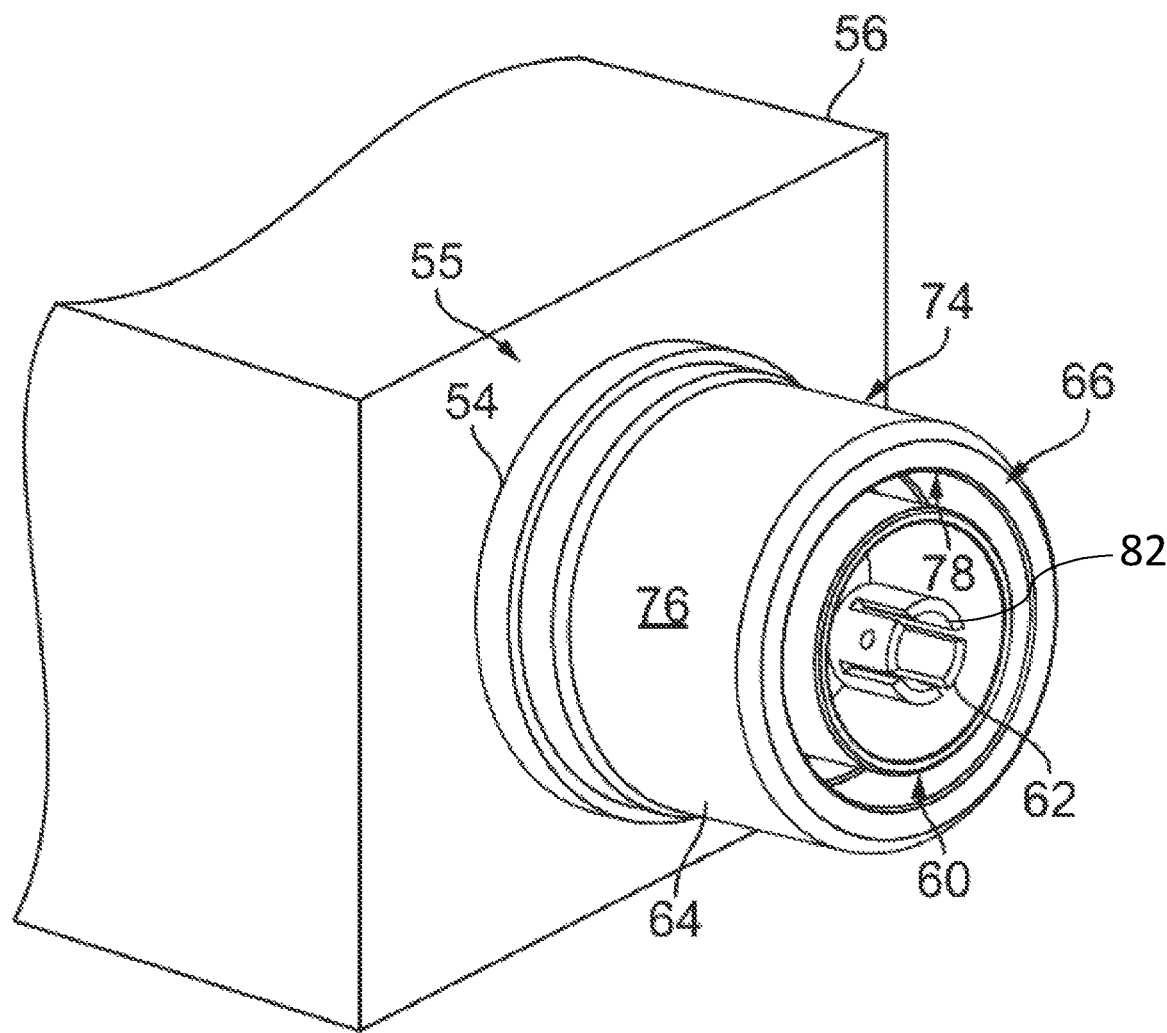
FIG. 7 is an isometric view of yet another embodiment of an interface port.

In the illustrated embodiment, the base 54 has a collar shape with a diameter larger than the diameter of the coupler engager 58. The coupler engager 58 is tubular in shape, has a threaded, outer surface 64 and a rearward end 66. The threaded outer surface 64 is configured to threadably mate with the threads of the coupler of a cable connector, such as connector assembly or connector 68 described below. In one embodiment illustrated in FIG. 6, the interface port 53 has a forward section 70 and a rearward section 72 of the coupler engager 58. The forward section 70 is threaded, and the rearward section 72 is non-threaded. In another embodiment illustrated in FIG. 7, the interface port 55 has a coupler engager 74. In this embodiment, the coupler engager 74 is the same as coupler engager 58 except that it has a non-threaded, outer surface 76 and a threaded, inner surface 78. The threaded, inner surface 78 is configured to be inserted into, and threadably engaged with, a cable connector.

Referring to FIGS. 5-8, in one embodiment, the signal carrier 62 is tubular and configured to receive a pin or inner conductor engager 80 of the cable connector 68. Depending upon the embodiment, the signal carrier 62 can have a plurality of fingers 82 which are spaced apart from each other about the perimeter of the signal carrier 80. When the inner conductor 84 of the coaxial cable 88 is inserted into the signal carrier 80, the fingers 82 apply a radial, inward force to the inner conductor 84 to establish a physical and electrical connection with the inner conductor 84. The electrical connection enables data signals to be exchanged between the devices that are in communication with the interface port. In one embodiment, the electrical ground 60 is tubular and configured to mate with a connector ground 86 of the cable connector 68. The connector ground 86 extends an electrical ground path to the electrical ground 60 as described below.

Cables

In one embodiment illustrated in FIGS. 4 and 8-10, the networks 2 and 12 include one or more types of coaxial cables 88 (or cables). In the embodiment illustrated in FIG. 8, the coaxial cable 88 has: (a) a conductive, central wire, tube, strand or inner conductor 84 that extends along a longitudinal axis 92 in a forward direction 94 (FIG. 8) toward the interface port 42, 43, 44; (b) a cylindrical or tubular dielectric, or insulator 96 that receives and surrounds the inner conductor 84; (c) a conductive tube or outer conductor 108 that receives and surrounds the insulator 96; and (d) a sheath, sleeve or jacket 104 that receives and surrounds the outer conductor 108. In the illustrated embodiment, the outer conductor 108 is corrugated, having a spiral, exterior surface 102. The exterior surface 102 defines a plurality of peaks and valleys to facilitate flexing or bending of the cable 88 relative to the longitudinal axis 92.

Figure 8:
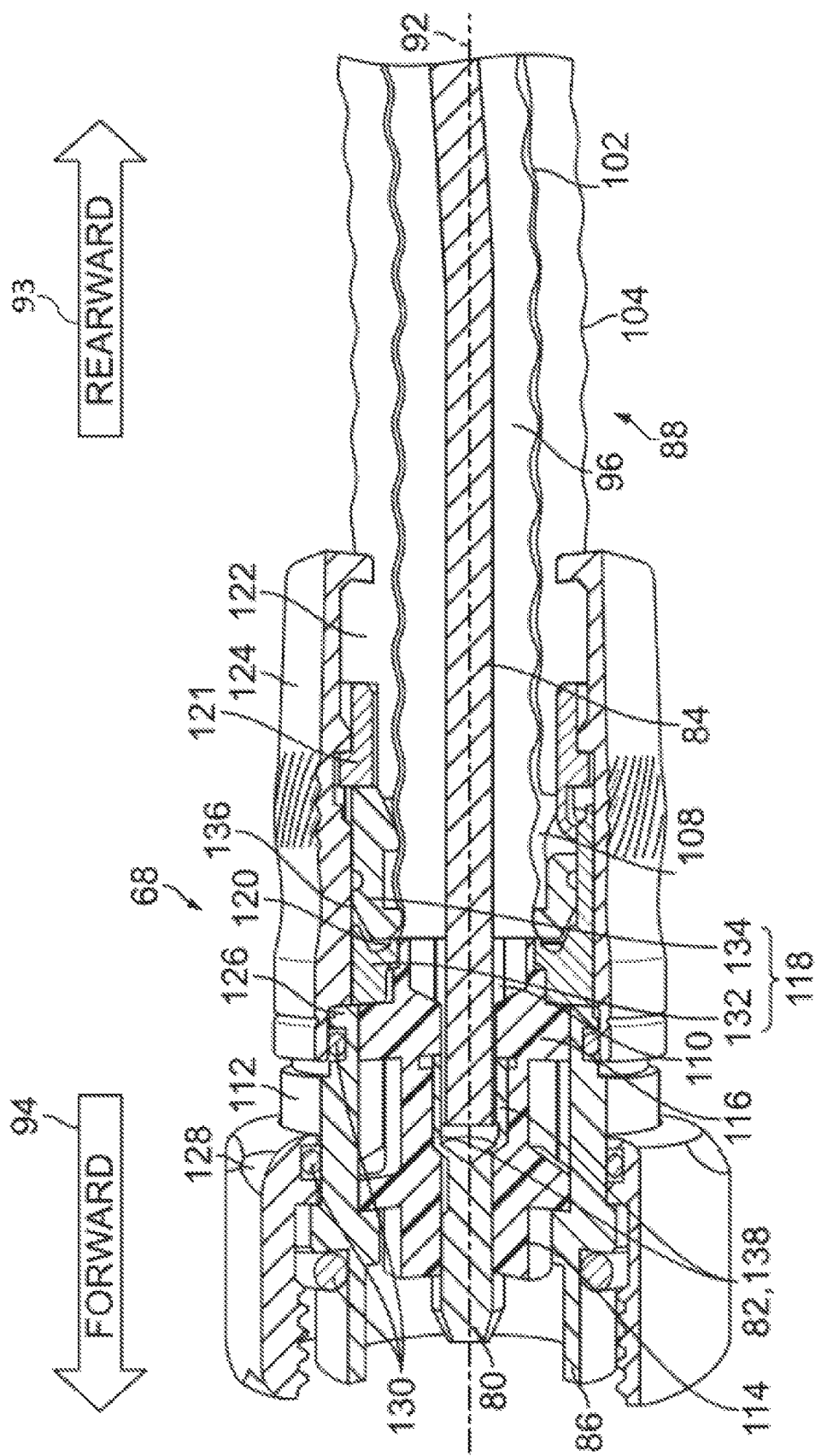
FIG. 8 is an isometric, cut-away view of one embodiment of a cable connector and cable.

To achieve the cable configuration shown in FIG. 8, an assembler/preparer, in one embodiment, takes one or more steps to prepare the cable 88 for attachment to the cable connector 68. In one example, the steps include: (a) removing a longitudinal section of the jacket 104 to expose the bare surface of the outer conductor 108; (b) removing a longitudinal section of the outer conductor 108 and insulator 96 so that a protruding end 110 of the inner conductor 84 extends forward, beyond the recessed outer conductor 108 and the insulator 96, forming a step-shape at the end of the cable 88; (c) removing or coring-out a section of the recessed insulator 96 so that the forward-most end of the outer conductor 108 protrudes forward of the insulator 96.

In another embodiment not shown, the cables of the networks 2 and 12 include one or more types of fiber optic cables. Each fiber optic cable includes a group of elongated light signal guides or flexible tubes. Each tube is configured to distribute a light-based or optical data signal to the networks 2 and 12.

Connectors

In the embodiment illustrated in FIG. 8, the cable connector 68 includes: (a) a connector housing or connector body 112; (b) a connector insulator 114 received by, and housed within, the connector body 112; (c) the inner conductor engager 80 received by, and slidably positioned within, the connector insulator 114; (d) a non-conductive driver 116 (or driver 116) configured to axially drive the inner conductor engager 80 into the connector insulator 114 as described below; (e) an outer conductor clamp device or outer conductor clamp assembly 118 configured to clamp, sandwich, and lock onto the end section 120 of the outer conductor 108; (f) a clamp driver 121; (g) a tubular-shaped, deformable, environmental seal 122 that receives the jacket 104; (h) a compressor 124 that receives the seal 122, clamp driver 121, clamp assembly 118, and the rearward end 126 of the connector body 112; (i) a nut, fastener or coupler 128 that receives, and rotates relative to, the connector body 112; and (j) a plurality of O-rings or ring-shaped environmental seals 130. The environmental seals 122 and 130 are configured to deform under pressure so as to fill cavities to block the ingress of environmental elements, such as rain, snow, ice, salt, dust, debris and air pressure, into the connector 68.

In one embodiment, the clamp assembly 118 includes: (a) a supportive outer conductor engager 132 configured to be inserted into part of the outer conductor 108; and (b) a compressive outer conductor engager 134 configured to mate with the supportive outer conductor engager 132. During attachment of the connector 68 to the cable 88, the cable 88 is inserted into the central cavity of the connector 68. Next, a technician uses a hand-operated, or power, tool to hold the connector body 112 in place while axially pushing the compressor 124 in a forward direction 94 (FIG. 8). For the purposes of establishing a frame of reference, the forward direction 94 (FIG. 8) is toward interface port 55 and the rearward direction 93 (FIG. 8) is away from the interface port 55.

The compressor 124 has an inner, tapered surface 136 defining a ramp and interlocks with the clamp driver 121. As the compressor 124 moves forward, the clamp driver 121 is urged forward which, in turn, pushes the compressive outer conductor engager 134 toward the supportive outer conductor engager 132. The engagers 132 and 134 sandwich the end section 120 of the outer conductor 108 positioned between the engagers 132 and 134. Also, as the compressor 124 moves forward, the tapered surface or ramp 136 applies an inward, radial force that compresses the engagers 132 and 134, establishing a lock onto the end section 120 of the outer conductor 108. Furthermore, the compressor 124 urges the driver 121 forward which, in turn, pushes the inner conductor engager 80 into the connector insulator 114.

The connector insulator 114 has an inner, tapered surface with a diameter less than the outer diameter of the mouth or grasp 138 of the inner conductor engager 80. When the driver 116 pushes the grasp 138 into the insulator 114, the diameter of the grasp 138 is decreased to apply a radial, inward force on the inner conductor 84 of the cable 88. As a consequence, a bite or lock is produced on the inner conductor 84.

Figure 5:
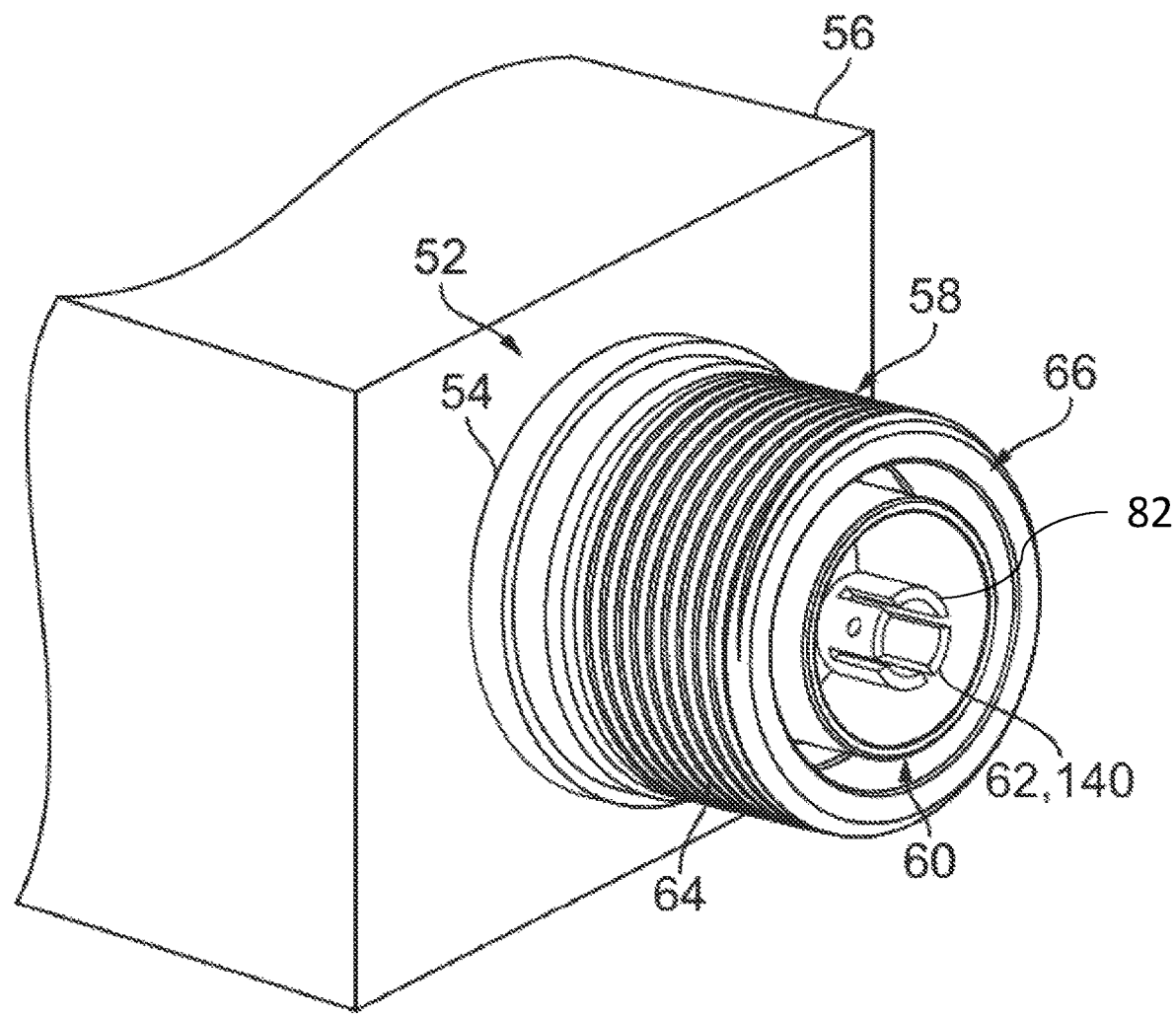
FIG. 5 is an isometric view of one embodiment of an interface port.

After the cable connector 68 is attached to the cable 88, a technician or user can install the connector 68 onto an interface port, such as the interface port 52 illustrated in FIG. 5. In one example, the user screws the coupler 128 onto the port 52 until the fingers 140 of the signal carrier 62 receive, and make physical contact with, the inner conductor engager 80 and until the electrical ground 60 engages, and makes physical contact with, the connector ground 86. During operation, the non-conductive, connector insulator 114 and the driver 116 serve as electrical barriers between the inner conductor engager 80 and the one or more electrical ground paths surrounding the inner conductor engager 80. As a result, the likelihood of an electrical short is mitigated, reduced or eliminated. One electrical ground path extends: (i) from the outer conductor 108 to the clamp assembly 118, (ii) from the conductive clamp assembly 118 to the conductive connector body 112, and (iii) from the conductive connector body 112 to the electrical ground 60. An additional or alternative electrical grounding path extends: (i) from the outer conductor 108 to the clamp assembly 118, (ii) from the conductive clamp assembly 118 to the conductive connector body 112, (iii) from the conductive connector body 112 to the conductive coupler 128, and (iv) from the conductive coupler 128 to the electrical ground 60.

These one or more grounding paths provide an outlet for electrical current resulting from magnetic radiation in the vicinity of the connector 68. For example, electrical equipment operating near the connector 68 can have electrical current resulting in magnetic fields, and the magnetic fields could interfere with the data signals flowing through the inner conductor 84. The grounded outer conductor 108 shields the inner conductor 84 from such potentially interfering magnetic fields. Also, the electrical current flowing through the inner conductor 84 can produce a magnetic field that can interfere with the proper function of electrical equipment near the cable 88. The grounded outer conductor 108 also shields such equipment from such potentially interfering magnetic fields.

The internal components of the connector 68 are compressed and interlocked in fixed positions under relatively high force. These interlocked, fixed positions reduce the likelihood of loose internal parts that can cause undesirable levels of passive intermodulation ("PIM") which, in turn, can impair the performance of electronic devices operating on the networks 2 and 12. PIM can occur when signals at two or more frequencies mix with each other in a non-linear manner to produce spurious signals. The spurious signals can interfere with, or otherwise disrupt, the proper operation of the electronic devices operating on the networks 2 and 12. Also, PIM can cause interfering RF signals that can disrupt communication between the electronic devices operating on the networks 2 and 12.

In one embodiment where the cables of the networks 2 and 12 include fiber optic cables, such cables include fiber optic cable connectors. The fiber optic cable connectors operatively couple the optic tubes to each other. This enables the distribution of light-based signals between different cables and between different network devices.

Environmental Protection

Figure 9:
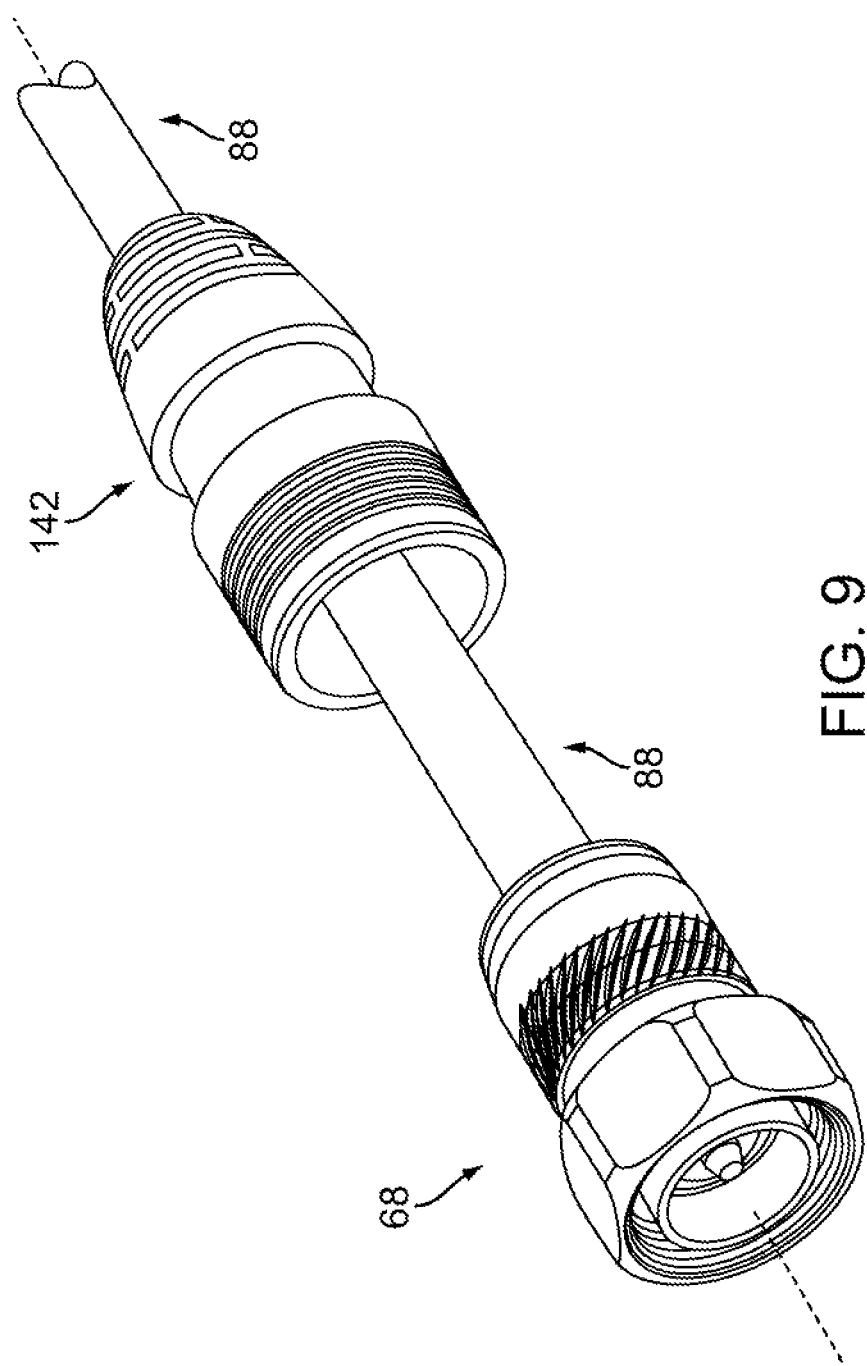
FIG. 9 is an isometric, exploded view of one embodiment of a cable assembly having a cover.
Figure 10:
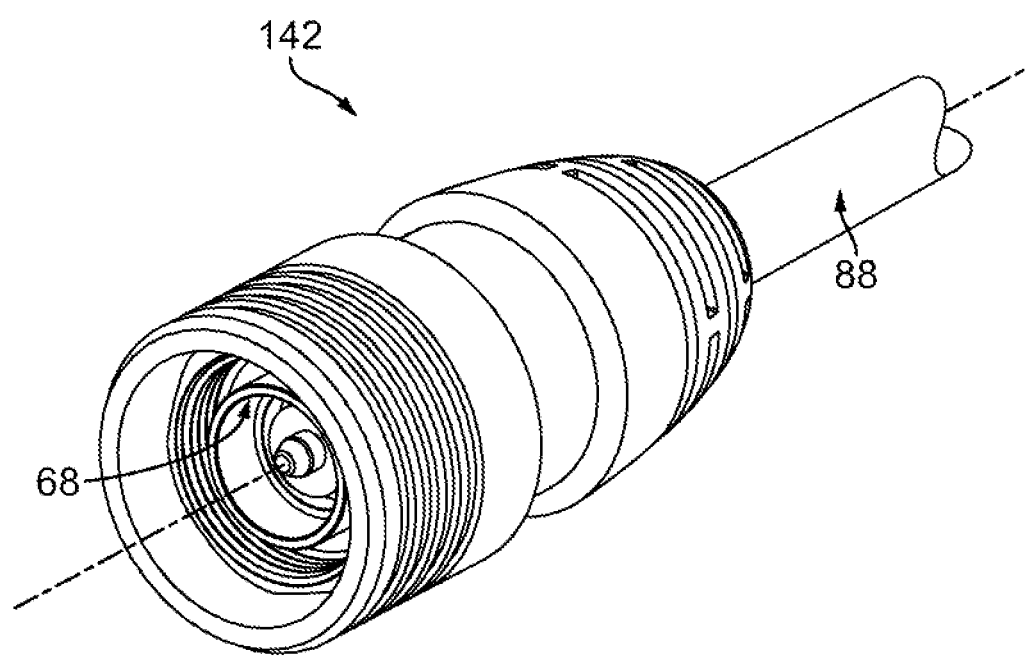
FIG. 10 is an isometric view of one embodiment of a cable connector covered by a cover.

In one embodiment, a protective boot or cover, such as the cover 142 illustrated in FIGS. 9-10, is configured to enclose part or all of the connector 68. In another embodiment, the cover 142 extends axially to cover the connector 68, the physical interface between the connector 68 and the interface port 52, and part or all of the interface port 52. The cover 142 provides an environmental seal to prevent the infiltration of environmental elements, such as rain, snow, ice, salt, dust, debris and air pressure, into the connector 68 and the interface port 52. Depending upon the embodiment, the cover 142 may have a suitable foldable, stretchable or flexible construction or characteristic. In one embodiment, the cover 142 may have a plurality of different inner diameters. Each diameter corresponds to a different diameter of the cable 88 or connector 68. As such, the inner surface of cover 142 conforms to, and physically engages, the outer surfaces of the cable 88 and the connector 68 to establish a tight environmental seal. The air-tight seal reduces cavities for the entry or accumulation of air, gas and environmental elements.

Materials

In one embodiment, the cable 88, connector 68 and interface ports 52, 53 and 55 have conductive components, such as the inner conductor 84, inner conductor engager 80, outer conductor 108, clamp assembly 118, connector body 112, coupler 128, electrical ground 60 and the signal carrier 62. Such components are constructed of a conductive material suitable for electrical conductivity and, in the case of inner conductor 84 and inner conductor engager 80, data signal transmission. Depending upon the embodiment, such components can be constructed of a suitable metal or metal alloy including copper, but not limited to, copper-clad aluminum ("CCA"), copper-clad steel ("CCS") or silver-coated copper-clad steel ("SCCCS").

The flexible, compliant and deformable components, such as the jacket 104, environmental seals 122 and 130, and the cover 142 are, in one embodiment, constructed of a suitable, flexible material such as polyvinyl chloride (PVC), synthetic rubber, natural rubber or a silicon-based material. In one embodiment, the jacket 104 and cover 142 have a lead-free formulation including black-colored PVC and a sunlight resistant additive or sunlight resistant chemical structure. In one embodiment, the jacket 104 and cover 142 weatherize the cable 88 and connection interfaces by providing additional weather protective and durability enhancement characteristics. These characteristics enable the weatherized cable 88 to withstand degradation factors caused by outdoor exposure to weather.

Weather Protecting Boot with Tactile Feedback

Figure 11:
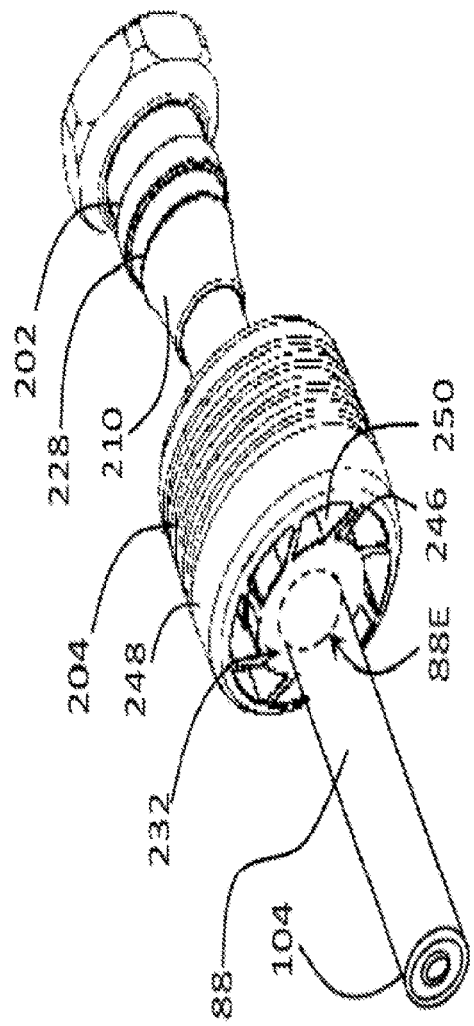
FIG. 11 is a exploded perspective view of an interface port, an over-mold cap sealed over the external surface of a coaxial cable, and a flexible Weather Protection (WP) boot sealably engaging an annular surface of the over-mold cap.

Referring to FIG. 11, a Weather Proofing/Protecting (WP) assembly 200 is provided for the coaxial cable 88 and the connector assembly 68. The terms "weather-proofing" and "weather-protecting" are used interchangeably herein inasmuch as the assembly provides either weather proofing or weather protection against the elements. In the described embodiment, the Weather Protecting (WP) assembly 200 comprises an over-mold cap 202 disposed over the prepared end 88E of the coaxial cable 88, and a compliant Weather Protecting (WP) boot 204 disposed over the over-mold cap 202. The over-mold cap 202 and WP boot 204 define a mating interface 206 configured to provide tactile feedback to an assembler/technician to facilitate proper installation of the WP boot 204 relative to the over-mold cap 202. The geometry and configuration of the mating interface 206 will be understood from the subsequent detailed description of the over-mold cap 202 and WP boot 204.

Figure 12:
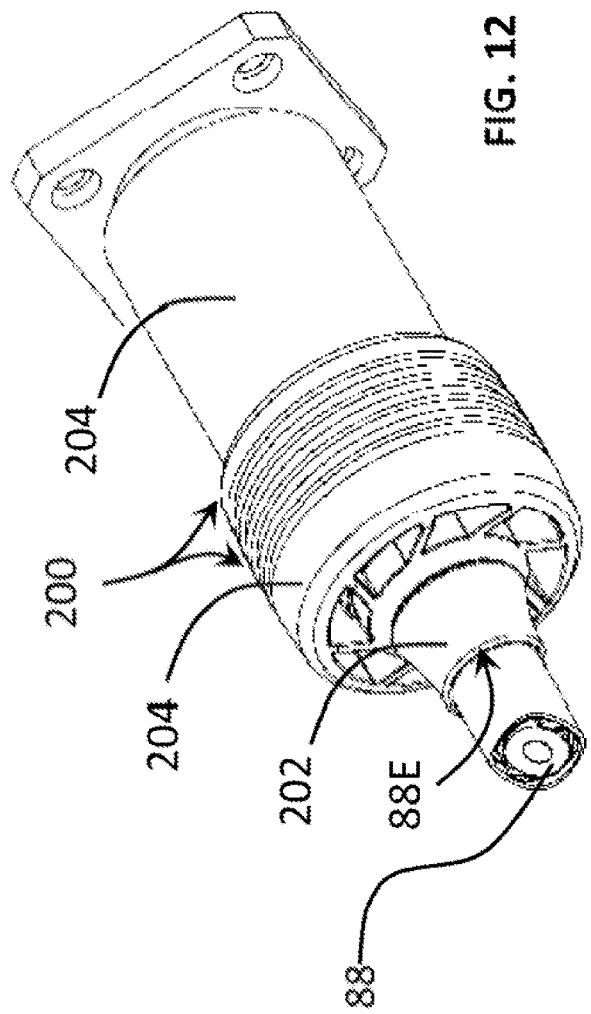
FIG. 12 is a perspective view of the flexible WP boot assembled in combination with the interface port.
Figure 14:
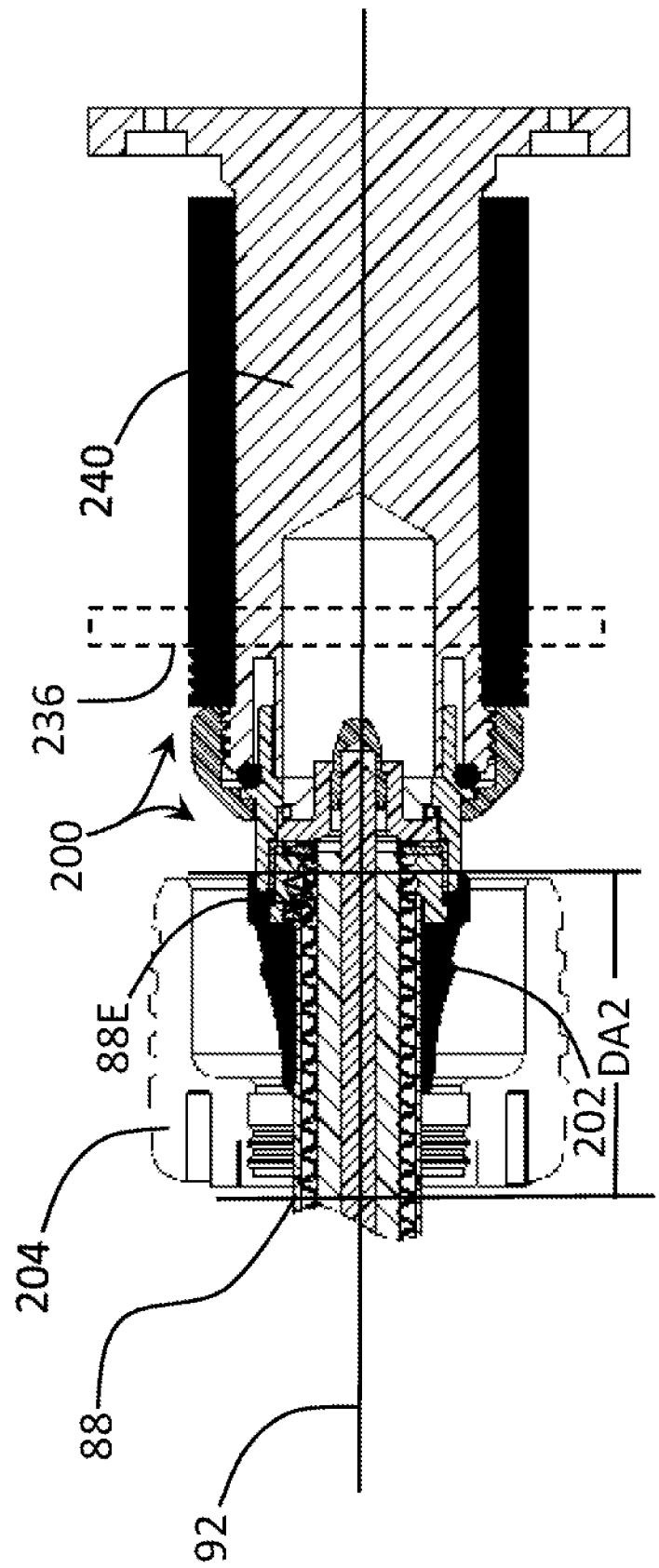
FIG. 14 is a cross-sectional view of the Weather Protection (WP) boot shown in an unassembled condition relative to the underlying over-mold cap and interface port.
Figure 15:
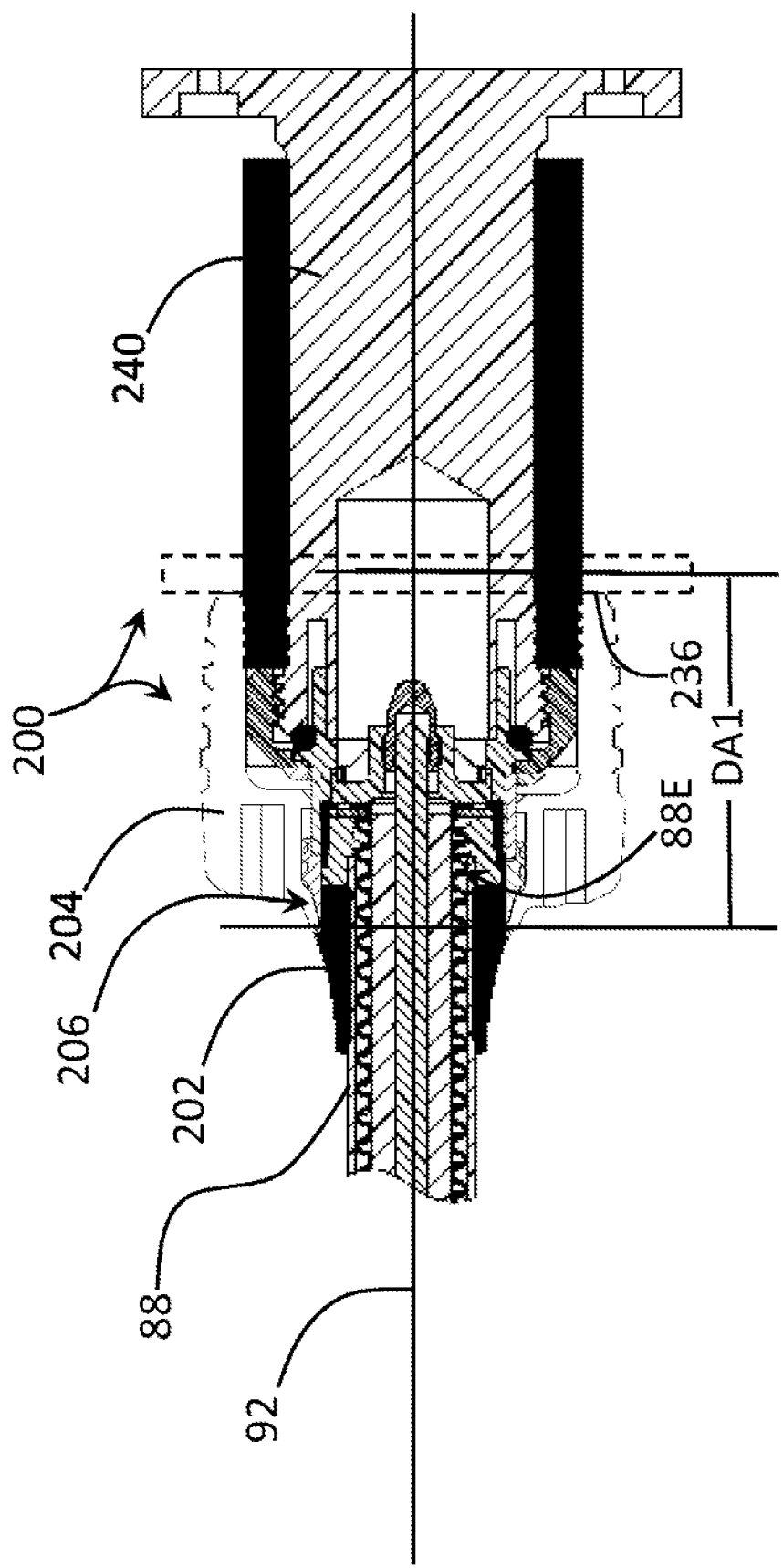
FIG. 15 is a cross-sectional view of the Weather Protection (WP) boot shown in an assembled condition relative to the underlying over-mold cap and interface port.

In FIGS. 11 and 12, the over-mold cap 202 has a first portion 210 which engages the coaxial cable 88 and a second portion 212 which engages the connector 68. The first portion 210: (i) circumscribes the prepared end 88E of the cable 88, and (ii) forms a seal with the outer conductor and/or compliant outer jacket 104 of the cable 88. More specifically, the first portion 210 comprises a shrinkable material which, when exposed to heat, closes over the outer conductor and/or compliant outer jacket 104 to produce a fluid-tight seal. Alternatively, a variety of other methods may be used to seal the first portion 210 of the over-mold cap 202 to the coaxial cable 88.

In the illustrated embodiment and referring to FIGS. 11-15, the over-mold cap 202 is substantially conical in shape and envelopes a conductive end fitting 224 of the outer conductor 108. More specifically, the over-mold cap 202 is configured with an interface surface 228, (e.g., a circumferential or annular groove or compliant protrusion) as illustrated in FIGS. 11 and 13a, for receiving an inwardly projecting lip or lip 232 of the compliant WP boot 204. The WP boot 204 is configured to engage the interface surface 228 (seen enlarged view of FIG. 13a) of the over-mold cap 202 such that the WP boot 204 is biased against a surface 236 (FIG. 14) of the interface port 240. That is, the interface surface 228 may include a raised edge 230 which is substantially normal to the elongate/longitudinal axis 92 of the coaxial cable 88 such that as the lip 232 slides over the interface surface 228, the WP boot 204 is axially displaced. More specifically, when the lip 232 engages the interface surface 228, the lip 232 rotates forwardly and downwardly such that the WP boot 204 is seated against the over-mold cap 202. When the lip 232 seats with the interface surface 228, the WP boot 204 is biased forwardly to form a seal with a surface 236 of the interface port 240. It is this motion which provides tactile feedback to the operator that the WP boot 204 is mounted properly.

A first axial length dimension DA1, i.e., measured between the lip 232 and the terminal end of the WP boot 204, is marginally or slightly larger than a second axial length dimension DA2, i.e., measured between the raised edge 230 of the over-mold cap 202 and the surface 236 of the interface port 240. As such, this geometry produces a biasing force between the WP boot 204 and the surface 236 of the interface port 240. More specifically, the compliant properties of the WP boot 204 in combination with the geometry of the WP boot 204 produce a biasing force between the end of the WP boot 204 and the surface 236 of the interface port 240 to produce a seal therebetween. It is this forward and rotational movement of the lip 232 which provides the feedback to the assembler/installer that the WP boot 204 is properly seated.

While the described embodiment depicts a lip 232 extending from the WP boot 204 to engage an interface surface of the over-mold cap 202, it will be appreciated that the geometry described herein may be reversed. That is, the WP boot 204 may comprise an interface surface for receiving an outwardly projecting lip of the over-mold cap 202. Moreover, the interface surface of the over-mold cap 202 need not circumscribe the entire circumference of the over-mold cap 202 or inner surface of the WP booth 204, but may include a plurality of segmented protrusions/detents (not shown) which collectively provide the requisite tactile feedback to the assembler/technician. Furthermore, while the lip 232 and interface surface 228 of the WP boot 204 is disposed at a terminal end thereof, the interface surface 228 may be disposed axially inboard of a terminal end of the WP boot 204 provided that a sufficient portion remains to produce an axial spring along the surface 236 of the interface port 240.

Returning to FIGS. 11 and 13a, the WP boot 204 defines an inner sleeve 246 and an outer sleeve 248 connected by a plurality of resilient non-radial spokes 250. In the described embodiment, a total of eight resilient non-radial spokes 250 project from the inner sleeve 246 to the outer sleeve 248. In the described embodiment, the resilient non-radial spokes 250 are integrally formed with, or along, a resilient wall 254 (FIG. 13a) which connects the inner and outer sleeves 246, 248. The resilient non-radial spokes 250 function to support the outer sleeve 248 without producing points of radial stiffness, as would be generated by, for example, a plurality of radial spokes. It will be appreciated that radial spokes can produce undulations in the inner and outer sleeves 246, 248 which might adversely impact the sealing ability of the mating interface 206. The resilient wall 254 is integrated and sealed to each of the resilient non-radial spokes 250 such that a seal is produced between the resilient non-radial spokes 250 and with the inner and outer sleeves 246, 248. While, in the described embodiment, the resilient wall 254 is disposed over the inboard edge or side, of each resilient non-radial spoke 250, it will be appreciated that the resilient wall 254 may be disposed along the outboard edge, or side, of each resilient non-radial spoke 250. In this way, the resilient non-radial spokes 250 function to provide the requisite softness, stability and support while producing a seal along the mating interface 206.

Operationally, the geometry of the over-mold cap 202 and the WP boot 204 completes a seal over the prepared end of the coaxial cable/connector. Furthermore, the mating interface 206 provides an assembler/technician with immediate feedback that the WP boot 204 has been properly installed. Moreover, the WP system 200 provides instant or "positive installation verification" to the technician that a WP boot 204 has been installed properly in combination with the prepared end 88E of the coaxial cable 88. The immediate feedback of a successful WP connection is of great value to network operators and system installers. In addition to providing a weather proof/protecting seal, the configuration uses less material than prior art WP boots, given that a shorter boot may be employed to engage the entire surface of the coaxial cable/connector.

The over-mold 202 cap may be composed of a thermoplastic, thermoset or elastomer material. The material of the over-mold cap 202 should provide a controlled shrink rate so that once installed it does not damage the underlying conductors and/or dielectric materials. The material should preferably have a low glassine temperature to facilitate molding without excessive heat. The over-mold cap 202 could alternatively be formed by injection molding.

The WP boot 204, in contrast, may be composed of a silicone elastomer or other compliant rubber material. In the described embodiment, the resilient material of the interface portion 206, 232 is an elastomer, rubber, silicone rubber, or urethane rubber material having a Shore A hardness greater than about 70A.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifica- The following is claimed:

1. A protection system for a coaxial cable connector, comprising:
   an over-mold cap disposed over a prepared end of a coaxial cable, the over-mold cap defining an interface surface; and
   a compliant boot circumscribing the over-mold cap to cover and protect at least a portion of the coaxial cable connector, wherein the compliant boot comprises a lip configured to engage the interface surface,
   wherein the lip and interface surface produce a mating interface which provides tactile feedback to an assembler/technician that the compliant boot is properly seated against the over-mold cap,
   wherein the over-mold cap comprises a first portion and a second portion, the first portion circumscribing the prepared end of the coaxial cable connector and the second portion enveloping an end of an interface port, and
   wherein the compliant boot defines an inner sleeve, an outer sleeve, a resilient wall orthogonal to an elongate axis of the compliant boot, and a plurality of non-radial spokes integral with the resilient wall and the inner and outer sleeves, the resilient wall providing a sealing surface between the inner and outer sleeves and the non-radial spokes to augment sealing along the mating interface.

2. The protection system of claim 1 wherein the first portion of the over-mold cap comprises a material which, when exposed to heat, shrinks over the prepared end of the coaxial cable.

3. The protection system of claim 1 wherein the interface surface includes a raised edge which is substantially normal to an elongate axis of the coaxial cable such that as the lip engages the raised edge of the interface surface, the compliant boot is axially displaced toward the interface port.

4. The protection system of claim 3 wherein the axial displacement of the compliant boot produces a seal between a surface of the interface port and the compliant boot.

5. The protection system of claim 1 wherein the compliant boot is formed from a material having a Shore A hardness of greater than about 70A.

6. A method for protecting a coaxial cable comprising the steps of:
   configuring an over-mold cap to be disposed over a prepared end of the coaxial cable, the over-mold cap having a conical portion defining an interface surface and a raised edge;
   configuring a compliant boot with an inner sleeve, an outer sleeve, a resilient wall orthogonal to an elongate axis of the compliant boot, and a plurality of non-radial spokes integral with the resilient wall and the inner and outer sleeves, the resilient wall providing a sealing surface between the inner and outer sleeves and the non-radial spokes augmenting a seal along a mating interface, the inner sleeve of the compliant boot defining a radial lip which is supported by the non-radial spokes and projects inwardly toward the over-mold cap; and
   sliding the compliant boot axially toward an interface port such that the radial lip engages the interface surface, rotates forwardly, and engages the raised edge of the interface surface;
   wherein forward rotation of the radial lip provides tactile feedback to an operator that the compliant boot has been properly mounted; and
   wherein the non-radial spokes of the compliant boot biases the radial lip against the interface surface of the over-mold cap to augment the seal between the compliant boot and the over-mold cap.

7. The method of claim 6 further comprising the step of biasing the compliant boot against a planar surface of the interface port.

8. The method of claim 6 further comprising the step of shrink wrapping the prepared end of the coaxial cable to envelop the over-mold cap.

9. The method of claim 6 further comprising the step of molding the compliant boot with an compliant elastomer having a Shore A hardness of greater than about 70A.

10. A weather protecting boot for use in combination with an over-mold cap of a coaxial cable, comprising:
    a compliant boot configured to engage an interface surface of the over-mold cap, the compliant boot defining an inner sleeve, an outer sleeve, and a plurality of resilient spokes connecting the inner and outer sleeves, the resilient spokes being non-radial and integrally formed along a resilient wall connecting the inner and outer sleeves;
    the inner sleeve defining a radial lip configured to engage the interface surface of the over-mold cap,
    wherein a planar surface of an interface port defines a first axial dimension,
    wherein the radial lip of the compliant boot defines a second axial dimension, and
    wherein the first axial dimension is larger than the second axial dimension to produce a biasing force between the compliant boot and the planar surface of the interface port to augment a seal therebetween, and
    wherein the radial lip engages a raised edge of the interface surface as the compliant boot slides over the over-mold cap to provide tactile feedback to an operator that the compliant boot has been properly seated with the over-mold cap during assembly.

11. The weather protecting boot of claim 10 wherein the compliant boot is formed from a material having a Shore A hardness of greater than about 70A.

* * * * *